(No Model.)

T. E. SIPE.
TRACING TOOL.

No. 481,721. Patented Aug. 30, 1892.

WITNESSES

INVENTOR

UNITED STATES PATENT OFFICE.

THALIA E. SIPE, OF ALLEGHENY, PENNSYLVANIA.

TRACING-TOOL.

SPECIFICATION forming part of Letters Patent No. 481,721, dated August 30, 1892.

Application filed April 15, 1892. Serial No. 429,309. (No model.)

*To all whom it may concern:*

Be it known that I, THALIA E. SIPE, of Allegheny city, in the county of Allegheny and State of Pennsylvania, have invented a new and useful Improvement in Tracing-Tools, of which the following is a full, clear, and exact description, reference being had to the accompanying drawings, forming part of this specification, in which—

Figure 1:
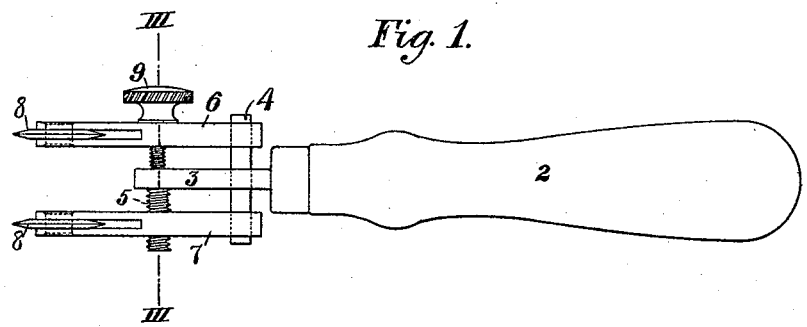
Figure 2:
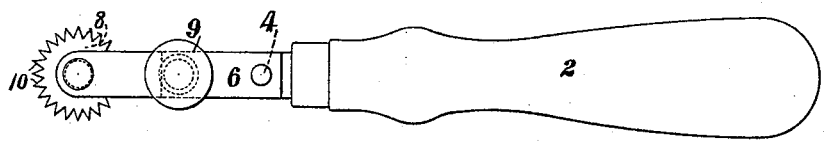

Figure 1 is a front elevation of my improved tracing-tool. Fig. 2 is a side elevation of the same; and Fig. 3 is a cross-section on the line III III of Fig. 1, looking toward the tracing-wheels.

My invention relates to that class of tracing-tools used for puncturing garment-patterns wherein two parallel adjustable wheels are employed; and it consists in improved means for adjusting the distance between the wheels, as hereinafter more fully described, and set forth in the claims.

Figure 3:
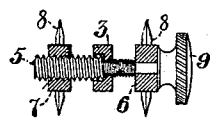

In the drawings, in which similar numerals indicate corresponding parts, the handle 2 of the tool is provided with a projecting shank 3, which is flattened upon its sides and provided with two holes, through the rear one of which passes the loose pin 4 and through the other passes the screw-threaded shaft 5, which is provided with two portions of different diameters, as shown in Fig. 3, and carries the arms 6 and 7. The hole in the shank is likewise enlarged in one portion and the smaller portion is screw-threaded to correspond with the reduced part of the shaft. The pitch of the enlarged portion of the shaft is twice that upon the smaller portion, and the arm 7 is interiorly screw-threaded and carried upon the enlarged part, while the other arm is carried loosely upon a reduced smooth portion of the shaft and is held in place by the collar forming the end of the screw-thread. The shaft is actuated by the milled head 9 thereon, and it is evident that as the screw-shaft is turned in either direction the wheels will be carried in opposite directions an equal distance. The tracing-wheels 8 8 are of the usual type, having the sharpened teeth 10, and are loosely mounted upon shafts in the slotted ends of the arms 6 and 7, which at their rear ends are provided with guiding-holes through which passes the pin 4.

The action of the device is obvious. The wheels being adjusted to the desired distance apart by the turning of the head 9, the wheels are placed upon the cloth or paper and rolled along, producing the desired marks at the required distance apart. The advantage of the placing of the wheels at equal distances from the central shank is that an equal pressure is brought upon each, whereas in former cases, one wheel being at the center and one at one side, the most of the pressure was exerted upon the center wheel and the mark of the side wheel was very faint.

The shaft may be provided with a right and left hand screw-thread, if desired, and the two arms interiorly screw-threaded to receive the same, the shank merely loosely encircling the shaft and preventing its endwise motion. This modification, as well as many other variations which will suggest themselves to those skilled in the art, I consider as coming within the scope of my invention.

I claim—

1. A tracing-tool having a handle, a shank projecting therefrom, a screw-threaded shaft passing through the shank and bearing two arms having tracing-wheels thereon, and a pin passing through holes in the shank and arms, substantially as and for the purposes described.

2. A tracing-tool having a handle, a shank projecting therefrom, a screw-threaded shaft passing through the shank and bearing two arms having tracing-wheels thereon, a head upon one end of the shaft, and a pin passing through holes in the shank and arms, substantially as and for the purposes described.

In testimony whereof I have hereunto set my hand this 11th day of April, A. D. 1892.

THALIA E. SIPE.

Witnesses.
H. M. CORWIN,
W. B. CORWIN.